United States Patent
Deprun

(10) Patent No.: US 8,280,986 B2
(45) Date of Patent: Oct. 2, 2012

(54) MOBILE TERMINAL AND ASSOCIATED STORAGE DEVICES HAVING WEB SERVERS, AND METHOD FOR CONTROLLING THE SAME

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 12/742,205

(22) PCT Filed: Nov. 18, 2008

(86) PCT No.: PCT/KR2008/006794
§ 371 (c)(1),
(2), (4) Date: May 10, 2010

(87) PCT Pub. No.: WO2009/066920
PCT Pub. Date: May 28, 2009

(65) Prior Publication Data
US 2010/0281139 A1    Nov. 4, 2010

Related U.S. Application Data

(60) Provisional application No. 60/989,886, filed on Nov. 23, 2007.

(51) Int. Cl.
G06F 15/16    (2006.01)

(52) U.S. Cl. .......................... 709/219; 709/217

(58) Field of Classification Search .................. 709/217, 709/219
See application file for complete search history.

(56) References Cited

U.S. PATENT DOCUMENTS

| 6,199,114 B1 * | 3/2001 | White et al. .................. 709/229 |
| 6,751,671 B1 * | 6/2004 | Urien ............................. 709/229 |
| 6,944,650 B1 * | 9/2005 | Urien ............................. 709/217 |
| 2002/0029254 A1 * | 3/2002 | Davis et al. ................... 709/217 |
| 2003/0086542 A1 | 5/2003 | Urien |
| 2010/0325236 A1 * | 12/2010 | Savinen et al. ............... 709/217 |

FOREIGN PATENT DOCUMENTS

| KR | 10-2004-0108320 A | 12/2004 |
| KR | 10-0663498 B1 | 1/2007 |
| WO | WO-2004/025922 A1 | 3/2004 |

* cited by examiner

*Primary Examiner* — Brian P Whipple
(74) *Attorney, Agent, or Firm* — Birch, Stewart, Kolasch & Birch, LLP

(57) ABSTRACT

A mobile terminal and its access control methods are discussed. According to an embodiment, the terminal includes an internal memory, and a controller configured to control the internal memory and to communicate with each of a plurality of storage units. Each storage unit includes a memory and a smart card web server (SCWS) configured to manage the memory, and a specific URL address is assigned to each storage unit. The controller is configured to access contents of the memory of each storage unit using the URL address of the respective storage unit.

4 Claims, 5 Drawing Sheets

[Fig. 1]
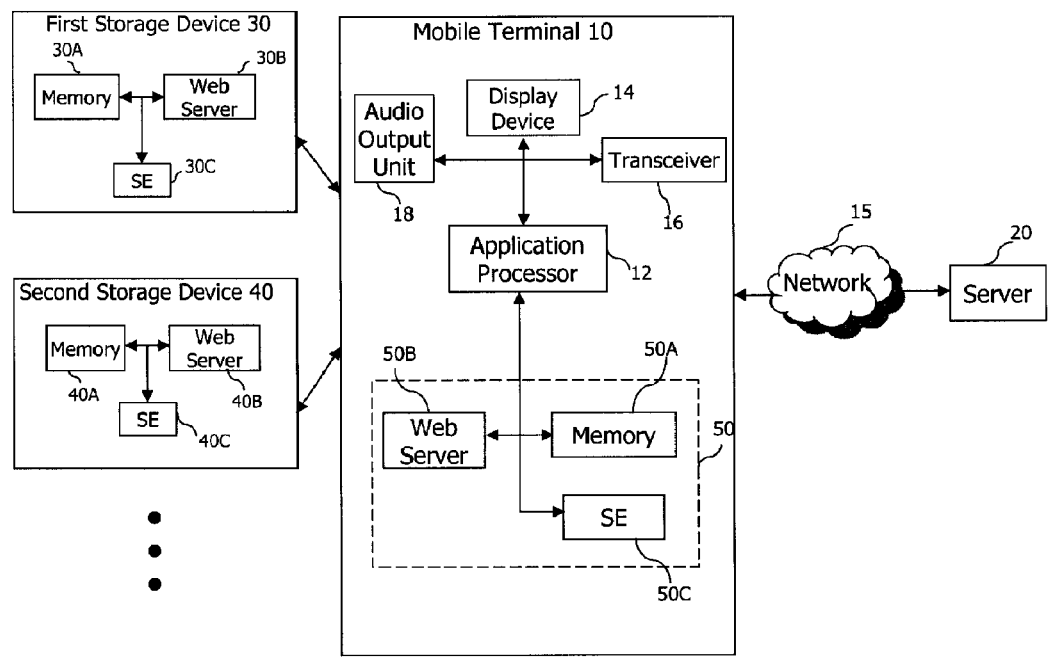

[Fig. 2]
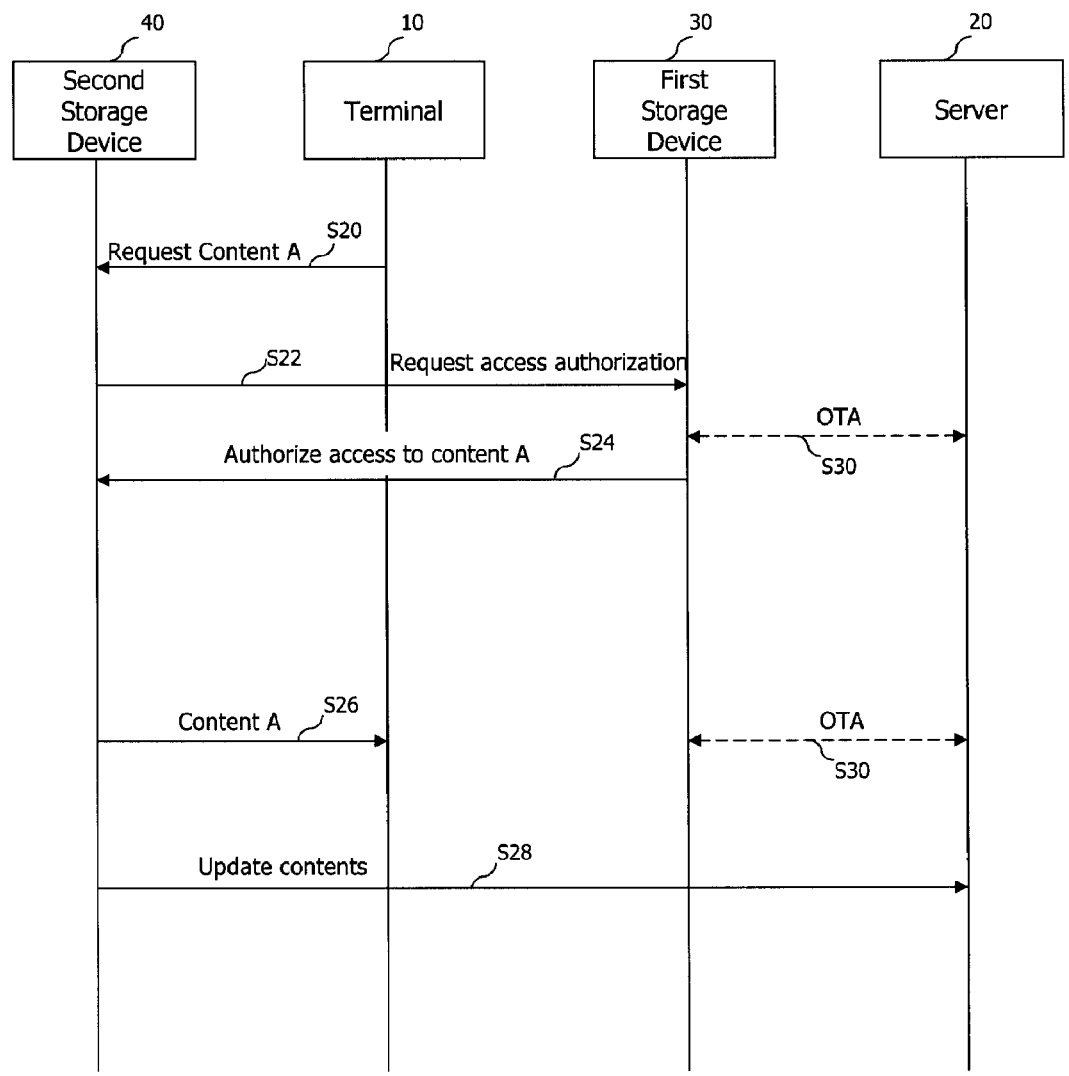

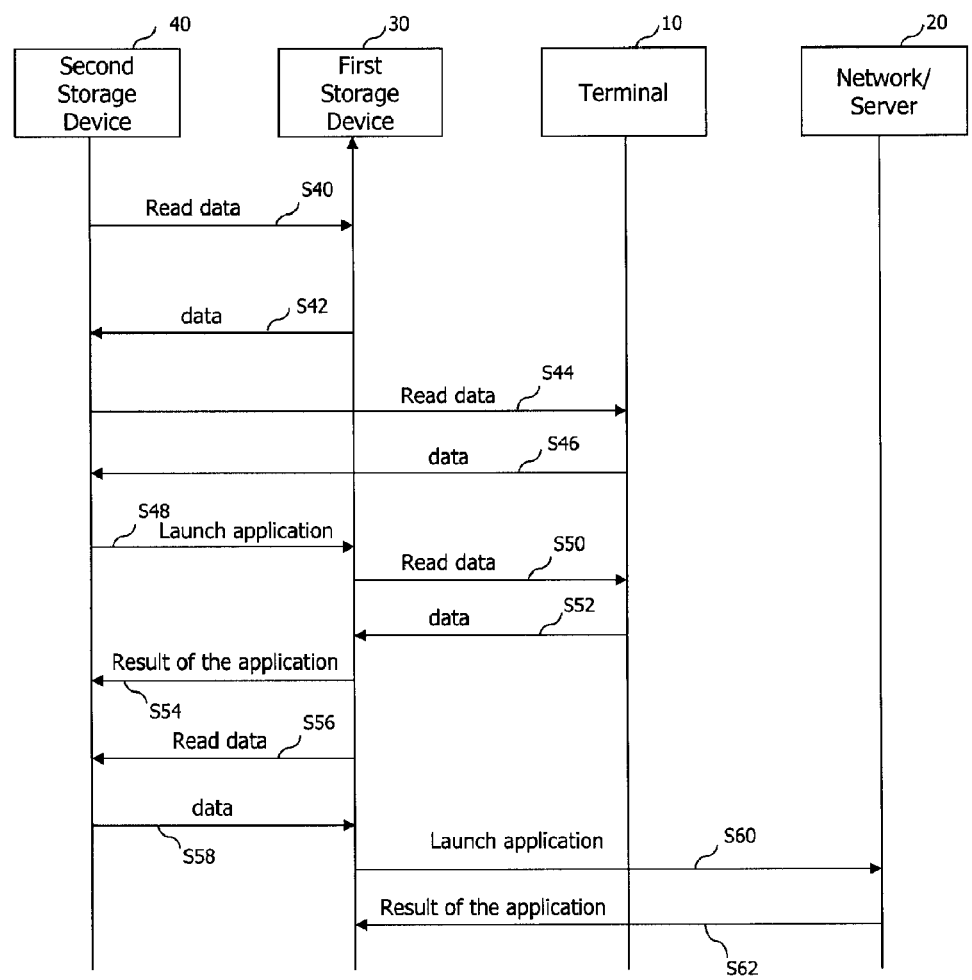

[Fig. 4]
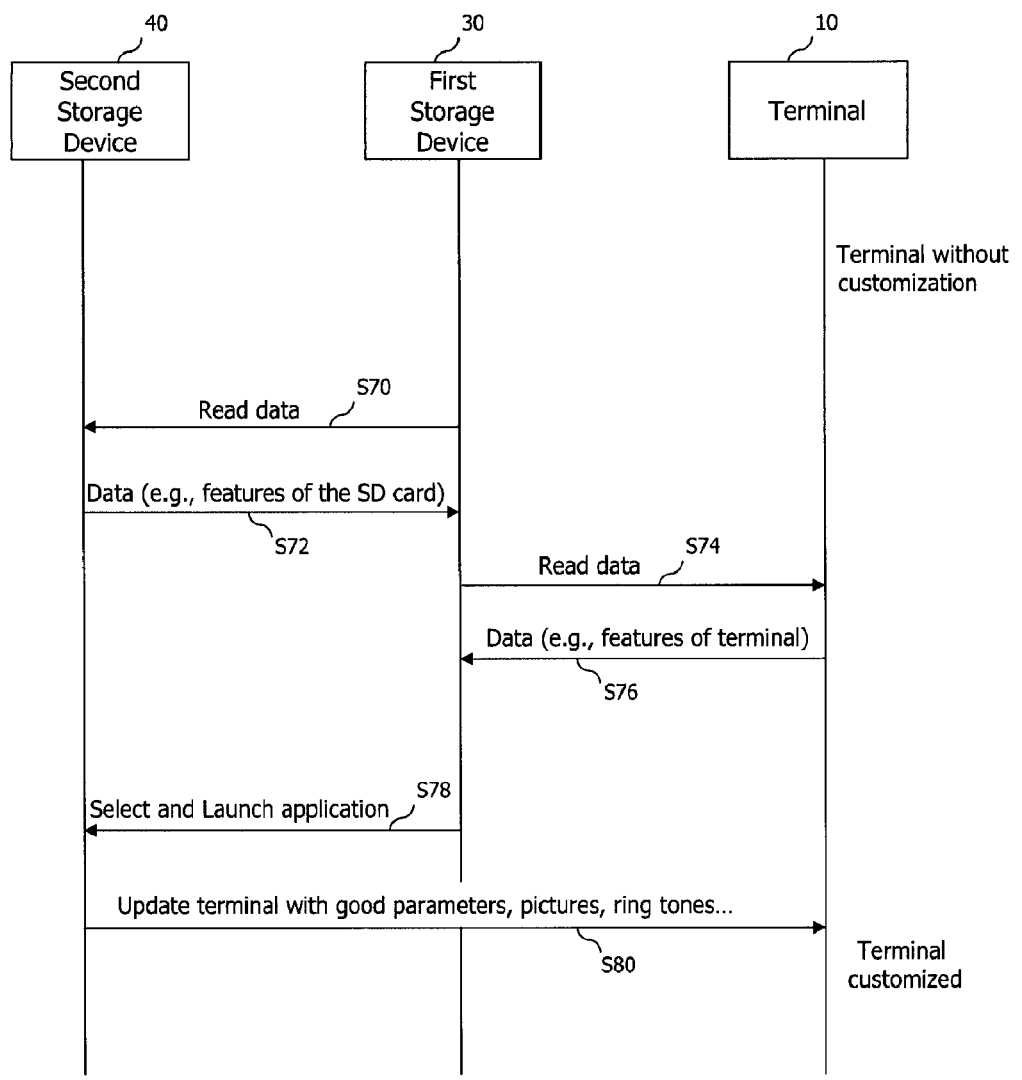

[Fig. 5]
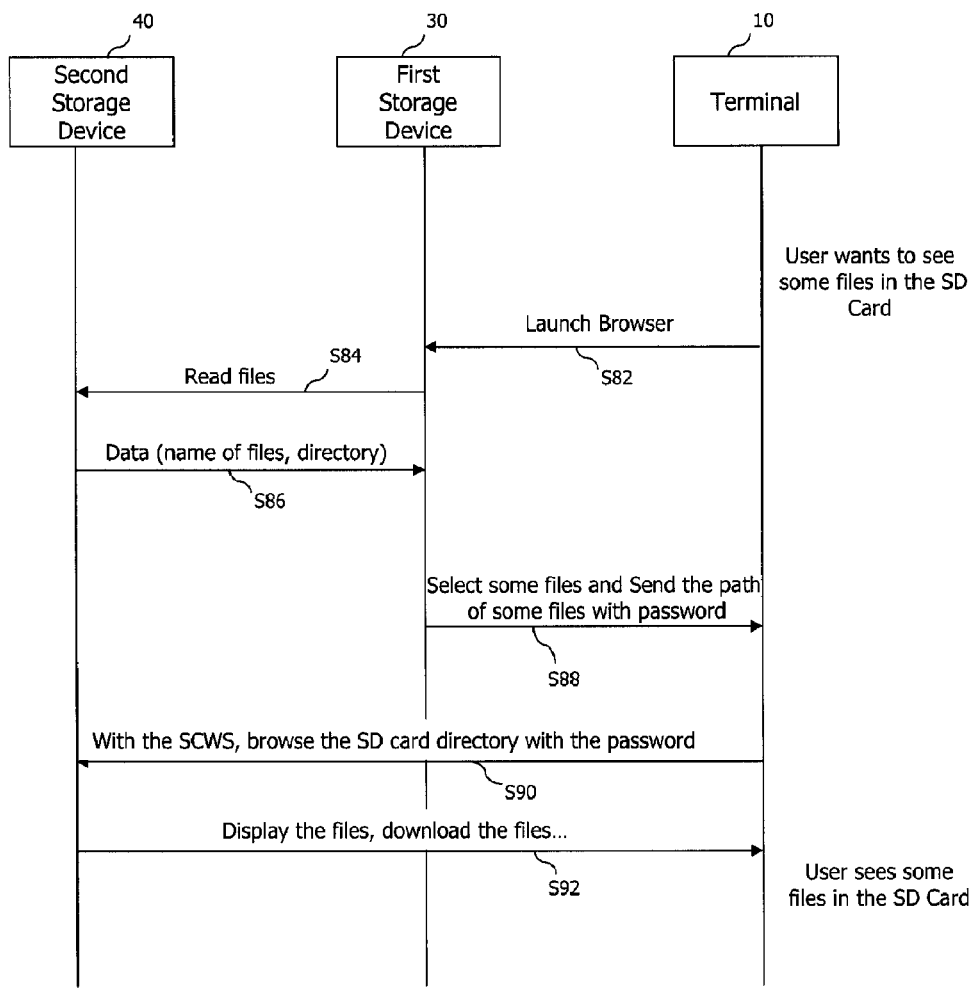

2

MOBILE TERMINAL AND ASSOCIATED STORAGE DEVICES HAVING WEB SERVERS, AND METHOD FOR CONTROLLING THE SAME

This application is the National Phase of PCT/KR2008/006794 filed on Nov. 18, 2008, which claims priority under 35U.S.C. 119(e) to U.S. Provisional Application No. 60/989,886 filed on Nov. 23, 2007. The entire contents of all are hereby expressly incorporated by reference into the present application.

TECHNICAL FIELD

The present invention relates to a terminal having multiple storage devices, and to a system and method for providing communication among a mobile terminal and its associated storage devices using web servers in the storage devices.

BACKGROUND ART

Technologies associated with mobile terminals are being rapidly developed and standardized, and such technologies offer better and more sophisticated services and products to end users. In this regard, some service providers and/or mobile terminal manufacturers include a removable storage device known as a SIM (Subscriber Identification Module) card in each of their mobile terminals. SIM cards are used to store subscriber information associated with the mobile terminals and are advantageous since the service providers can update contents of their SIM cards provided in the mobile terminals using known communication procedures such as an OTA (Over-The-Air) operation.

According to recent standardization documents of Open Mobile Alliance (OMA), a SIM card having a HTTP/web server can be provided in a mobile terminal. This HTTP server may be also referred to as a Smart Card Web Server (SCWS) and is a server that can process HTTP commands according to well known HTTP protocols (e.g., HTTP/1.1).

However, only one single SIM card having the SCWS is allotted per mobile terminal. As a result, it is not possible for a mobile terminal to access and control multiple SIM cards or other removable storage devices associated with the mobile terminal. Further, it is not possible for these multiple storage devices to interact with each other or other entities through the mobile terminal.

DISCLOSURE OF INVENTION

Technical Solution

A technical goal of the present invention is to provide a mobile terminal with multiple storage devices having web servers therein and to allow the multiple storage devices to interact with each other through the mobile terminal.

Another technical goal of the present invention is to provide a mobile terminal having associated storages devices, each storage device having a HTTP server or web server and a unique URL (Uniform Resource Locator) address assigned thereto, whereby each storage device can access contents of another storage device associated with the mobile terminal and launch applications in another storage device using the URL address of the corresponding storage device.

Another technical goal of the present invention is to provide multiple storage devices associated with a mobile terminal, wherein one storage device can use resources (e.g., a lager memory, faster interface speed, etc.) of another storage device through the mobile terminal.

Another technical goal of the present invention is to provide various methods of applications and controls for a mobile terminal associated with multiple storage devices having web servers.

According to an aspect of the present invention, there is provided a mobile terminal comprising: an internal memory; and a controller configured to control the internal memory and to communicate with each of a plurality of storage units, wherein each of the storage units includes a memory and a smart card web server (SCWS) configured to manage the memory, and a specific URL address is assigned to each storage unit, and wherein the controller is configured to access contents of the memory of each storage unit using the URL address of the respective storage unit.

According to another aspect of the present invention, there is provided a storage device for communicating with a mobile terminal, comprising: a memory; and a smart card interaction unit configured to manage the memory, and to access contents of a memory of another storage device connected to the mobile terminal using a URL address of the another storage device.

According to another aspect of the present invention, there is provided a method for accessing contents using a mobile terminal, comprising: transmitting a request to access certain contents to a first storage device associated with the mobile terminal; relaying a request for access authorization from the first storage device to a second storage device associated with the mobile terminal, the access authorization pertaining to accessing the certain contents; relaying a response to the request for access authorization from the second storage device to the first storage device; and receiving the certain contents from the first storage device according to the response.

According to another aspect of the present invention, there is provided a mobile terminal, comprising: an internal memory; and a controller configured to control the internal memory and to communicate with first and second storage devices associated with the mobile terminal, the controller configured to: transmit a request to access certain contents to the first storage device, relay a request for access authorization from the first storage device to the second storage device, the access authorization pertaining to accessing the certain contents, relay a response to the request for access authorization from the second storage device to the first storage device, and receive the certain contents from the first storage device according to the response.

Advantageous Effects

The present invention allows a mobile terminal to communicate with each of its associated storage devices and the storage devices to communicate with each other by using the web servers of the storage devices. As a result, the resources of one storage device associated with the mobile terminal can now be accessed, used, modified and controlled by another storage device, the mobile terminal or another entity such as a network server. For example, contents in each storage device can be accessed by another storage device, the mobile terminal or a network server. Further, applications stored in each storage device can be launched in that storage device or in another storage device or the mobile terminal. Moreover, a network connection can be made by the web server in each of the storage devices.

BRIEF DESCRIPTION OF THE DRAWINGS

FIG. 1 is a block diagram illustrating system architecture for a mobile terminal to control and access multiple storage devices associated to the mobile terminal according to an embodiment of the present invention.

FIG. 2 is a flowchart illustrating a method for providing communication among a mobile terminal and its associated storage devices according to a first embodiment of the present invention.

FIG. 3 is a flowchart illustrating a method for providing communication among a mobile terminal and its associated storage devices according to a second embodiment of the present invention.

FIG. 4 is a flowchart illustrating a method for providing communication among a mobile terminal and its associated storage devices according to a third embodiment of the present invention.

FIG. 5 is a flowchart illustrating a method for providing communication among a mobile terminal and its associated storage devices according to a fourth embodiment of the present invention.

MODE FOR THE INVENTION

Hereinafter, preferred embodiments of the present invention will be described in detail with reference to the accompanying drawings. The following embodiments should be considered in descriptive sense only and not for purpose of limitation.

FIG. 1 is a block diagram illustrating system architecture for a mobile terminal to control and access multiple storage devices associated to the terminal according to an embodiment of the present invention.

Referring to FIG. 1, the system includes a mobile terminal 10, a plurality of storage devices 30, 40, 50, . . . associated with the mobile terminal 10, and a server 20 configured to communicate with the mobile terminal 10 via a communication network 15. The storage devices 30, 40, 50, . . . can be inserted into the mobile terminal 10 or otherwise connected to the mobile terminal 10 wirelessly or via a wired connector. All the components of the system are operatively coupled and configured.

Each of the storage devices 30, 40, 50, . . . can be any type of smart card such as SIM, USIM, UICC, R-UIM, CSIM, etc., a SD (Secure Digital) card or MMC (MultiMediaCard) card, or an internal memory of the mobile terminal 10. Any number of storage devices can be provided in association with the mobile terminal 10.

For only as a non-limiting example, in FIG. 1, the first and second storage devices 30 and 40 can be a SIM card and a SD card, respectively and the third storage device 50 can be the internal memory of the mobile terminal 10. In another non-limiting example, the first and second storage devices 30 and 40 can both be SIM cards or SD cards. The SIM and SD cards are generally inserted into the mobile terminal 10, but are removable from the mobile terminal 10.

Further, each of the storage devices 30, 40, 50, . . . includes a memory 30A, 40A, 50A, . . . for storing contents, and a web/HTTP server (also referred to herein as smart card interaction units) 30B, 40B, 50B, . . . for interpreting and processing HTTP commands when the HTTP commands are received from another storage device or another entity and for responding to the HTTP commands. Here, the contents can be any data or information, e.g., applications/programs, files such as multimedia files, MP3 files, xHTML files, static files, dynamic files, etc., subscriber information, service provider information, video/audio data, etc. Further, the web servers or smart card interaction units 30B, 40B, 50B, . . . are also referred to herein as smart card web servers (SCWSs) and can be servers or applications that can send/interpret commands such as HTTP commands.

Optionally but preferably, each of the storage devices 30, 40, 50, . . . can further include a secure element 30C, 40C, 50C, . . . which renders the respective storage device as a secure device. The secure element 30C, 40C, 50C, . . . can include any of the known encryption and decryption modules/programs and/or authentication module/program for providing more secure data communication between the storage device and another entity. For example, the secure elements can use known TLS (Transport Layer Security) protocols for providing secure data communication using public key infrastructure (PKI). Thus, according to an embodiment of the present invention, any communication among the storage devices 30, 40, 50, . . . , the mobile terminal 10, and any other entity such as the server 20 or another network entity can be securely provided using known secure data communication techniques.

In the present invention, the storage devices 30, 40, 50, . . . are assigned with different URL (Uniform Resource Locator) addresses, respectively, so that each storage device can be referenced based on HTTP protocols. In one example of implementation, for each storage device, a unique URL address can be assigned to a slot or connection area allotted for that storage device of the mobile terminal, e.g., one URL address for a SIM card connector of the mobile terminal, another URL address for a SD card connector, etc. In that case, even if the current SIM card in the mobile terminal is replaced with a new SIM card, the same URL address that was used for the old SIM cards can still be used for the new SIM card, which provides continuity to the use of SIM cards.

The URL addresses of the different storage devices associated with the mobile terminal can be provided in each of the storage devices by the mobile terminal or by a network entity such as the server 20 using known data updating techniques such as an OTA communication.

Since a different URL address is assigned to each storage device, the mobile terminal 10 or any other entity (e.g., the server 20 or other network entity) can now reference, access and communicate selectively with each individual storage device by communicating with the web server of that storage device using the URL address of that storage device. Further, each storage device can now access and communicate selectively with any of the other storage devices using its web server and the URL address of any other desired storage device.

More specifically, as a non-limiting example only, the following URL addresses can be assigned to the storage devices 30, 40, 50, . . . :

http://127.0.0.1:XXXX for the first storage device 30 (e.g., a SIM card)

http://127.0.0.2:xxxx for the second storage device 40 (e.g., a SD card)

http://127.0.0.3:xxxx for the third storage device 50 (e.g., an internal memory of the terminal)

http://127.0.0.4:XXXX for a fourth storage device, and so on.

As mentioned previously, any of the storage devices 30, 40, 50, . . . can be addressed and accessed using its specified URL address. For instance, if a content stored in the SD card (e.g., second storage device 40) is called "foobar.xhtml" and has a path "/pub/files", then this content can be addressed and/or accessed by the mobile terminal 10, the server 20, or the other web servers 30B, 50B, . . . by generating a HTTP command including the URL address of: http://127.0.0.2:3516/pub/ files/foobar.xhtml which identifies the desired content in the second storage device (http://127.0.0.2).

Similarly, the URL address of a particular storage device can be used to trigger or launch applications stored in that storage device. For instance, the web server 30B of the first storage device 30 may send an HTTP command of "http://127.0.0.2:3516/cgi/start?launch" (indicating the URL of the second storage device 40) to the second storage device 40, through a processor (12) of the mobile terminal 10, to launch an application stored in the second storage device 40. Further, a particular storage device can launch an application present in another storage device with data present in yet another storage device.

In fact, according to the present invention, there are various ways in which advantageous operations among these various entities such as the terminal, storage devices, server, etc. can be made using the URLs and web servers of the storage devices. For instance, each web server in each storage device can display contents, launch applications, and establish internet or other network connections through the mobile terminal. For example, the SIM card or SD card can read, write, modify, and remove data or applications and launch applications stored in the SD card or SIM card or the internal memory of the mobile terminal. In another example, the mobile terminal can read, write, modify, and remove data or applications and launch applications stored in the SIM card or SD card. Further, service providers can update or load contents and applications directly to each of the storage devices, which can be accessed by any other storage device. Moreover, a user or operator can view, access, manipulate, manage, and exchange contents stored in each storage device through the mobile terminal and the web servers of the storage devices effectively.

Now, having described the storage devices, the components of the mobile terminal 10 will be described below.

The mobile terminal 10 includes a controller or application processor 12, a display device 14 for displaying contents, a transceiver 16 for transmitting and/or receiving various signals, an audio output unit 18 for outputting audio sounds, the memory 50A, the web server 50B, and the optional secure element (SE) 50C. The internal memory 50A, web server 50B and SE 50C can constitute the third storage device 50 as mentioned above. The mobile terminal 10 can include other known components such as a camera module, keypads, a touch pad, additional memories, etc.

The mobile terminal 10 can be any device configured to communicate with the storage devices 30, 40, 50, . . . associated with the mobile terminal 10, and with other entities such as the server 20 or another mobile terminal through the network 15. For example, the mobile terminal 10 can be a mobile phone, a smart phone device, a computer notebook, a handset, a user equipment, a mobile station, etc.

In the present invention, communications among the different storage devices 30, 40, 50, . . . are discussed. However, it should be noted that any communication between these storage devices would be made through the application processor 12 or other suitable module of the mobile terminal 10. Further, in the examples of the invention, although a web server in each storage device is preferably used, it may be possible that a storage device that receives a particular HTTP command can process the HTTP command using a microprocessor in lieu of the web server.

Now, having described the system architecture of FIG. 1, various methods according to the embodiments of the present invention will be discussed referring to FIGS. 2-5. These methods can be implemented in the system of FIG. 1 or in other suitable devices or system. Further, in FIGS. 2-5, the first and second storage devices 30 and 40 are assume to be a SIM card and a SD card, respectively. Further, any communications between the first and second storage device 30 and 40 are always made through the application processor 12 of the mobile terminal as mentioned above, where the application processor 12 merely functions as a relaying unit.

Particularly, FIG. 2 is a flowchart illustrating a method for providing communication among a mobile terminal and its associated storage devices according to a first embodiment of the present invention. In this example, the second storage device 40 (SD card) can store therein a large volume of various contents and the first storage device 30 (SIM card) can store therein subscriber information and content access authorization information for accessing the contents stored in the SD card.

At step S20 of FIG. 2, in response to a user's request to access a particular content, Content A (e.g., an MP3 song), the mobile terminal 10 sends a request to access Content A to the second storage device 40. For example, the application processor 12 of the mobile terminal 10 may send a request command (e.g., a GET command or any other HTTP command) to the web server 40B of the second storage device 40 using the URL of the second storage device 40.

At step S22, the second storage device 40 sends an authorization request to the first storage device 30 using the URL of the first storage device 30. For instance, if the second storage device 40 determines that requested Content A requires an access authorization before Content A can be accessed, then the web server 40B sends an authorization request (e.g., any known HTTP command) to the web server 30B of the first storage device 30 using the URL of the first storage device 30.

At step S24, the web server 30B evaluates the received request and provides access authorization for Content A by sending an authorization approved signal back to the second storage device 40. For example, the web server 30B may evaluate the subscriber information stored therein and/or communicate with a service provider (e.g., the server 20) associated with Content A or user or terminal to determine or recognize whether or not Content A is authorized to be accessed. For instance, the web server 30B may communicate with the server 20 through an OTA operation to obtain access authorization information at step S30. Such communication may occur through the application processor 12 of the mobile terminal. Then the web server 30B may send an authorization approved signal back to the second storage device 40, or may send an authorization rejected signal back to the second storage device 40.

At step S26, if the access of Content A is authorized, the second storage device 40 sends Content A to the terminal 10. For instance, the web server 40B transmits or broadcasts Content A to the application processor 12 which processes Content A according to the user's request.

At step S28, any network entity (e.g., the server 20) stores or updates any contents or data in the memory 40A of the second storage device 40 by communicating with the web server 40B using the URL of the second storage device 40, e.g., according to HTTP protocols or OTA operation. Such communication may occur through the application processor 12 of the mobile terminal. For instance, if the service provider desires to store additional contents (e.g., additional songs that the user has selected or paid for), then the server of the service provider communicates with the web server 40B of the second storage device 40 and downloads the additional contents to the memory 40A of the second storage device. Further, the service provider or the server 20 can store or update any content or information (e.g., network information, service information, subscriber information, etc.) stored in the memory 30A of the first storage device 30 using an OTA operation or other known operation.

Accordingly, even though different storage devices may store different kinds of information, such information can be accessed, shared and processed to provide enhanced services to users and operators associated with the mobile terminal.

FIG. 3 is a flowchart illustrating examples of methods for providing communication among a mobile terminal and its associated storage devices according to a second embodiment of the present invention.

At step S40 of FIG. 3, the web server 40B of the second storage device 40 (e.g., SD card) can send a request (e.g., HTTP command) to read certain data stored in the memory 30A of the first storage device 30 (e.g., SIM card inserted in the terminal 10) using the URL of the first storage device 30. Then at step S42, the web server 30B interprets the received request and supplies the requested data to the second storage device 40.

Similarly, at step S44, the web server 40B of the second storage device 40 can send a request (e.g., HTTP command) to read certain data stored in the memory 50A of the terminal 10 using the URL of the third storage device 50 of the terminal 10. Then at step S46, the web server 50B interprets the received request and supplies the requested data to the second storage device 40.

At step S48, the web server 40B of the second storage device 40 can launch an application stored in the first storage device 30 by using the URL of the first storage device 30. Then in the application that is launched in the first storage device 30, the web server 30B can request and obtain any desired data which may be stored in the memory 50A of the terminal 10 using the URL of the third storage device 50, at steps S50 and S52. Any data produced from the application is then transmitted from the first storage device 30 to the second storage device 40 at step S54 as the web servers 30B and 40B communicate with each other based on the HTTP protocols.

At steps S56 and S58, the web server 30B of the first storage device 30 can request and obtain any specific data/content stored in the memory 40A of the second storage device 40 using the URL of the second storage device 40. Then at step S60, the web server 30B can request launching of a specific application stored at a network side based on the obtained specific data, by communicating with a network server 20 (e.g., through the network 15 or sane other operation such as OTA). At step S62, data or communication produced from the application that is running is sent back from the server 20 to the first storage device 30 through the web server 30B.

Accordingly, through the web servers 30B, 40B, 50B, ... and the use of URLs assigned to the storage devices 30, 40, 50, ..., various communications and operations including exchanging of data and launching of applications among the terminal 10, the storage devices 30, 40, 50, ... and any other entity such as the network server or another terminal can be advantageously provided according to the present invention.

FIG. 4 is a flowchart illustrating a method for providing communication among a mobile terminal and its associated storage devices according to a third embodiment of the present invention. In this example, since a SIM card may have a small memory size and a low interface speed while an SD card may have a large memory size and a high interface speed, a large amount of contents can be stored in the SD card, which can be accessed quickly by the SIM card. As a result, a virtual large SIM card may be realized according to this embodiment.

More particularly, at steps S70 and S72 of FIG. 4, the web server 30B of the first storage device 30 (e.g., a SIM card) associated with the terminal 10 sends a request to read certain data stored in the second storage device 40 using the URL of the second storage device 40, and obtains the requested data from the second storage device 40. For example, the web server 30B can request to read a file containing the specification of the second storage device (e.g., SD card) from the second storage device 40. This file can contain various information and parameters pertaining to the second storage device 40, e.g., capabilities, size, data speed, identification information, etc. Based on the obtained information, the first storage device 30 can determine if a virtual SIM function is supported by the second storage device 40. Here, the virtual SIM function can refer to the ability of the SIM card 30 to use the resources of the other storage device such as the SD card 40, so as to render them to be part of the SIM card 30. If the virtual SIM function is supported, then the first storage device 30 can access various applications stored in the second storage device 30 and any data or content associated with launching the applications from the second storage device 40. That is, multiple operations of requesting and obtaining data may be performed in steps S70 and S72.

At steps S74 and S76, if the first storage device 30 determines that the virtual SIM function is supported, then the web server 30B requests and obtains specification information of the terminal 10 from the terminal 10 using the URL of the third storage device 50 in the terminal 10. For instance, the specification information of the terminal 10 can include, e.g., type of terminal, size of screen in the terminal, capabilities of terminal, memory size of terminal, data speed of terminal, specification of audio and video features of terminal, etc.

At step S78, the first storage device 30 (e.g., web server 30B) selects a particular application to launch based on the various information obtained through steps S70-S76 and any other information (e.g., subscriber information, service information, service provider information, etc. which may be obtained or stored in the memory 30A). Then the web server 30B requests the second storage device 40 to launch the selected application in the second storage device 40 using the URL of the second storage device 40.

At step S80, contents produced from the running of the application are transmitted from the second storage device 40 to the terminal 10, so that the terminal 10 can be updated and customized with such contents, e.g., specific parameters for the terminal 10, pictures, ring tones for the terminal 10, etc. Further, since the second storage device 40 (SD card) has a higher data speed and size than the first storage device 30 (SIM card), the updating of even large files can be performed more quickly by using the second storage device 40 instead of the first storage device 30.

Accordingly, the present invention allows updating and customization of the terminal (or a storage device) by sharing various resources of the terminal and its storage devices with each other.

FIG. 5 is a flowchart illustrating a method for providing communication among a mobile terminal and its associated storage devices according to a fourth embodiment of the present invention.

At step S82, if a user of the terminal 10 desires to view certain contents or files stored in the second storage device 40 (e.g., SD card in the mobile terminal 10), then the terminal 10 launches the browser or the web server 30B in response to the user's request. This may be accomplished by transmitting from the terminal 10 to the first storage device 30 a request for the first storage device 30 to access the second storage device 40.

Then at step S84, the web server 30B sends a request to access information on all files stored in the second storage device 40 using the URL of the second storage device 40. At step S86, the web server 30B then receives names of all or most files and/or directories in the second storage device 40 from the second storage device 40.

At step S88, then depending on data rights information, the web server 30B sends the path information (e.g., file names and/or directories) of sane of the files in the second storage device 40 with its proper access authorization information (e.g., password, pin code, user ID, etc.) to the terminal 10 for subsequent use. The data rights information can include copy protection information or access right information indicating which files are copy-protected or access-prohibited/permitted and/or which user can access the files or file information. In one example, the first storage device 30 may in advance store therein the data rights information for a particular user, terminal, service, contents, etc. This data rights information and/or proper access authorization information can be updated or removed by an operator or network server using an OTA or other known operation.

At steps S90 and S92, the web server 50B of the terminal 10 communicates with the web server 40B and browses the allowed one or more directories or files in the memory 40A of the second storage device 40 using the proper access authorization information. For instance, using only the proper access authorization information obtained in step S88, the certain files/directories of the second storage device can be displayed, accessed and downloaded under the control of the web server 50B. Meanwhile, other directories not authorized to be accessed are not displayed to the user and are hidden and thus protected from any unauthorized access.

Accordingly, the present invention allows an effective way to selectively control access to information among the terminal and storage devices.

While the present invention has been particularly shown and described with reference to exemplary embodiments thereof, it will be understood by those skilled in the art that various changes in form and details may be made therein without departing from the spirit and scope of the present invention as defined by the appended claims.

Industrial Applicability

The present invention may be applicable to a mobile terminal, one or more storage devices associated with the terminal, and a network entity associated with the terminal or storage device(s), for accessing, modifying, and controlling contents stored in the storage devices.

The invention claimed is:

1. A method for accessing contents using a mobile terminal, comprising:
   transmitting a request to access certain contents to a first storage device associated with the mobile terminal, wherein the request is either a GET command or other HTTP command, wherein the request is transmitted to a smart card web server (SCWS) of the first storage device using an URL (Uniform Resource Locator) of the first storage device, wherein the SCWS is configured to manage a memory included in the first storage device;
   relaying a request for access authorization from the first storage device to a second storage device associated with the mobile terminal using an URL of the second storage device, the access authorization pertaining to accessing the certain contents;
   relaying a response to the request for access authorization from the second storage device to the first storage device, wherein a SCWS of the second storage device evaluates the request for access authorization and provides the access authorization for the certain contents, wherein the SCWS of the second storage device communicates with an authorization server through an Over-The-Air (OTA) operation to obtain access authorization information for the access authorization;
   receiving the certain contents from the first storage device according to the response; and
   updating contents stored in at least one of the first and second storage devices through the mobile terminal,
   wherein the updating is performed using an OTA operation, and
   wherein the first storage device is a SD (Secure Digital) card and the second storage device is a SIM (Subscriber Identification Module) card.

2. The method of claim 1, wherein the response is generated based on the URL of the first storage device.

3. A mobile terminal, comprising:
   an internal memory; and
   a controller configured to control the internal memory and to communicate with first and second storage devices associated with the mobile terminal, the controller configured to:
   transmit a request to access certain contents to the first storage device, wherein the request is either a GET command or other HTTP command, wherein the request is transmitted to a smart card web server (SCWS) of the first storage device using an URL (Uniform Resource Locator) of the first storage device, wherein the SCWS is configured to manage a memory included in the first storage device;
   relay a request for access authorization from the first storage device to the second storage device using an URL of the second storage device, the access authorization pertaining to accessing the certain contents,
   relay a response to the request for access authorization from the second storage device to the first storage device, wherein a SCWS of the second storage device evaluates the request for access authorization and provides the access authorization for the certain contents, wherein the SCWS of the second storage device communicates with an authorization server through an Over-The-Air (OTA) operation to obtain access authorization information for the access authorization;
   receive the certain contents from the first storage device according to the response; and
   relay signals for updating contents stored in at least one of the first and second storage devices, to the at least one of the first and second storage devices,
   wherein the updating is performed using an OTA operation, and
   wherein the first storage device is a SD (Secure Digital) card and the second storage device is a SIM (Subscriber Identification Module) card.

4. The mobile terminal of claim 3, wherein the response is generated based on the URL of the first storage device.

* * * * *